US011151071B1

(12) United States Patent
Patel et al.

(10) Patent No.: US 11,151,071 B1
(45) Date of Patent: Oct. 19, 2021

(54) HOST DEVICE WITH MULTI-PATH LAYER DISTRIBUTION OF INPUT-OUTPUT OPERATIONS ACROSS STORAGE CACHES

(71) Applicant: EMC IP Holding Company LLC, Hopkinton, MA (US)

(72) Inventors: Rimpesh Patel, Bangalore (IN); Amit Pundalik Anchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/884,148

(22) Filed: May 27, 2020

(51) Int. Cl.
G06F 13/40 (2006.01)
G06F 12/10 (2016.01)

(52) U.S. Cl.
CPC .......... *G06F 13/4022* (2013.01); *G06F 12/10* (2013.01)

(58) Field of Classification Search
None
See application file for complete search history.

(56) References Cited

U.S. PATENT DOCUMENTS

| | | | |
|---|---|---|---|
| 6,045,277 A * | 4/2000 | Kurashina | B41J 3/4075 400/61 |
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,461,208 B1 * | 12/2008 | Caprioli | G06F 12/0864 711/128 |
| 7,617,292 B2 | 11/2009 | Moore et al. | |
| 7,668,981 B1 | 2/2010 | Nagineni et al. | |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Henry Tsai
*Assistant Examiner* — Christopher A Bartels
(74) *Attorney, Agent, or Firm* — Ryan, Mason & Lewis, LLP (57) ABSTRACT

An apparatus comprises a host device configured to communicate over a network with a storage system. The host device comprises a multi-path input-output (MPIO) driver configured to control delivery of input-output (TO) operations to the storage system over selected ones of a plurality of paths through the network. The MPIO driver is further configured to determine mappings between ranges of logical block addresses (LBAs) of logical storage volumes and respective ones of a plurality of cache entities of the storage system, to select, for a first IO operation comprising a first set of LBAs of a first logical storage volume, a first one of the paths associated with a first one of the cache entities, and to select, for a second IO operation comprising the first set of LBAs of a second logical storage volume, a second one of the paths associated with a second one of the cache entities.

20 Claims, 3 Drawing Sheets

(56) References Cited

U.S. PATENT DOCUMENTS

| | | |
|---|---|---|
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 2002/0023151 A1 | 2/2002 | Iwatani |
| 2002/0039420 A1* | 4/2002 | Shacham ............... G06F 7/723 380/277 |
| 2002/0103923 A1 | 8/2002 | Cherian et al. |
| 2004/0010563 A1 | 1/2004 | Forte et al. |
| 2005/0050240 A1* | 3/2005 | Wilkins ............... G06F 3/0653 710/15 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2007/0198538 A1* | 8/2007 | Palacios ............. G06F 16/2428 |
| 2008/0043973 A1 | 2/2008 | Lai et al. |
| 2008/0201458 A1 | 8/2008 | Salli |
| 2008/0209576 A1* | 8/2008 | Nooning ................ G06F 21/10 726/29 |
| 2008/0301332 A1 | 12/2008 | Butler et al. |
| 2009/0187815 A1* | 7/2009 | Becerra, Sr. .......... G06F 16/283 715/212 |
| 2009/0259749 A1 | 10/2009 | Barrett et al. |
| 2010/0250497 A1* | 9/2010 | Redlich ............... H04L 63/0227 707/661 |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2017/0315858 A1* | 11/2017 | Borah ................ G06F 11/3072 |
| 2018/0157521 A1* | 6/2018 | Arikatla ............. G06F 9/45558 |
| 2018/0157522 A1* | 6/2018 | Bafna ................ G06F 9/45558 |
| 2018/0157561 A1* | 6/2018 | Venkatesh ................ G06F 8/65 |
| 2018/0157677 A1* | 6/2018 | Bafna ..................... G06F 3/064 |
| 2018/0157752 A1* | 6/2018 | Arikatla ............... G06F 16/182 |
| 2018/0157860 A1* | 6/2018 | Nair .................... G06F 9/45558 |
| 2018/0159729 A1* | 6/2018 | Deshmukh ............. H04L 67/10 |
| 2018/0189635 A1 | 7/2018 | Olarig et al. |
| 2018/0253256 A1 | 9/2018 | Bharadwaj |
| 2018/0317101 A1 | 11/2018 | Koue |
| 2018/0373748 A1* | 12/2018 | Kuhnke .......... H04N 21/64322 |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

* cited by examiner

HOST DEVICE WITH MULTI-PATH LAYER DISTRIBUTION OF INPUT-OUTPUT OPERATIONS ACROSS STORAGE CACHES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (TO) operations for delivery to the storage system. For example, in the case of write requests, a given such write request is sent by a host device to the storage system, and an acknowledgement is received in the host device if the write request is successfully processed in the storage system. In these and other situations involving processing of IO requests received from a host device, a storage system may utilize one or more local caches in processing the received IO requests. For example, write requests of the type mentioned previously may be initially stored in one or more write caches of the storage system, and then acknowledged back to the host device, before being de-staged to a destination storage device of the storage system. Performance of the storage system in these and other situations that involve processing IO requests received from a host device can be adversely impacted by cache-related issues of the storage system.

SUMMARY

Illustrative embodiments configure a multi-path layer of one or more host devices to include functionality for distribution of IO operations, in conjunction with communication with a storage array or other type of storage system via a storage area network (SAN) or other type of network, across multiple storage caches. The multi-path layer illustratively comprises at least one multi-path input-output (MPIO) driver configured to process IO operations of at least one host device. In some embodiments, the MPIO driver implements storage cache distribution processing in conjunction with path selection in order to provide improved sequential write performance.

In one embodiment, an apparatus comprises a host device configured to communicate over a network with a storage system comprising a plurality of storage devices. The host device comprises an MPIO driver configured to control delivery of IO operations to the storage system over selected ones of a plurality of paths through the network. The MPIO driver is further configured to determine mappings between ranges of logical block addresses of two or more logical storage volumes and respective ones of a plurality of cache entities of the storage system, to select, for a first input-output operation comprising a first set of logical block addresses of a first one of the two or more logical storage volumes, a first one of the plurality of paths associated with a first one of the plurality of cache entities of the storage system, and to select, for a second input-output operation comprising the first set of logical block addresses of a second one of the two or more logical storage volumes, a second one of the plurality of paths associated with a second one of the plurality of cache entities of the storage system.

The storage devices illustratively may comprise respective ones of the two or more logical storage volumes.

In some embodiments, the cache entities of the storage system comprise respective components of the storage system that have respective local caches associated therewith. For example, the cache entities of the storage system can comprise respective storage controllers of the storage system with each such storage controller having a different local cache associated therewith. Numerous other arrangements of storage processors, directors or other cache entities can be used in other embodiments.

In some embodiments, the MPIO driver is further configured to select, for a third input-output operation comprising a second set of logical block addresses of the first logical storage volume, an additional one of the plurality of paths associated with an additional one of the plurality of cache entities different than the first cache entity of the storage system. The additional cache entity may comprise the second cache entity. The second set of logical block addresses may comprise a second set of logical block address offsets adjacent to a first set of logical block address offsets of the first set of logical block addresses.

Determining the mappings between the ranges of logical block addresses of the two or more logical storage volumes and respective ones of the plurality of cache entities of the storage system may comprise determining a sequence of identifiers of the plurality of cache entities. From the sequence of identifiers of the plurality of cache entities, starting indexes for each of the two or more logical storage volumes may be determined. Element indexes for different logical block offsets for a given one of the two or more logical storage volumes may be determined from the sequence of identifiers of the plurality of cache entities based at least in part on the starting index for the given logical storage volume.

In some embodiments, determining the sequence of identifiers of the plurality of cache entities comprises generating an alpha-numeric sorted string of the identifiers of the plurality of cache entities, determining a plurality of permutations of the alpha-numeric sorted string of the identifiers of the plurality of cache entities, generating a sorted substring of the plurality of permutations of the alpha-numeric sorted string of the identifiers of the plurality of cache entities, and generating a horizontally different substring from the sorted substring, the horizontally different substring comprising an ordering of the plurality of permutations of the alpha-numeric sorted strings of the identifiers of the plurality of cache entities that avoids consecutive entries having the same cache entity identifier.

Selecting the first path, in some embodiments, may comprise identifying a given volume number of the first logical storage volume and a given logical block address offset number of the first set of logical block addresses, determining a starting index in the sequence of identifiers of the plurality of cache entities for the first logical storage volume based at least in part on the given volume number of the first logical storage volume, and determining an element index in the sequence of identifiers of the plurality of cache entities for the first set of logical block addresses of the first logical storage volume based at least in part on the starting index and the given logical block address offset number, wherein the first cache entity is associated with an identifier of the determined element index. Determining the starting index in the sequence of identifiers of the plurality of cache entities for the first logical storage volume may comprise calculating X modulo (p*n), where X denotes the given volume number of the first logical storage volume, p denotes a total number of the plurality of permutations, and n denotes a total number of the plurality of cache entities. Determining the element index in the sequence of identifiers of the plurality of cache entities for the first logical storage volume may comprise calculating E modulo (p*n), where E denotes a sum of the given volume number of the first logical storage volume and the given logical block address offset number of the first set of logical block addresses, p denotes a total number of the plurality of permutations, and n denotes a total number of the plurality of cache entities.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
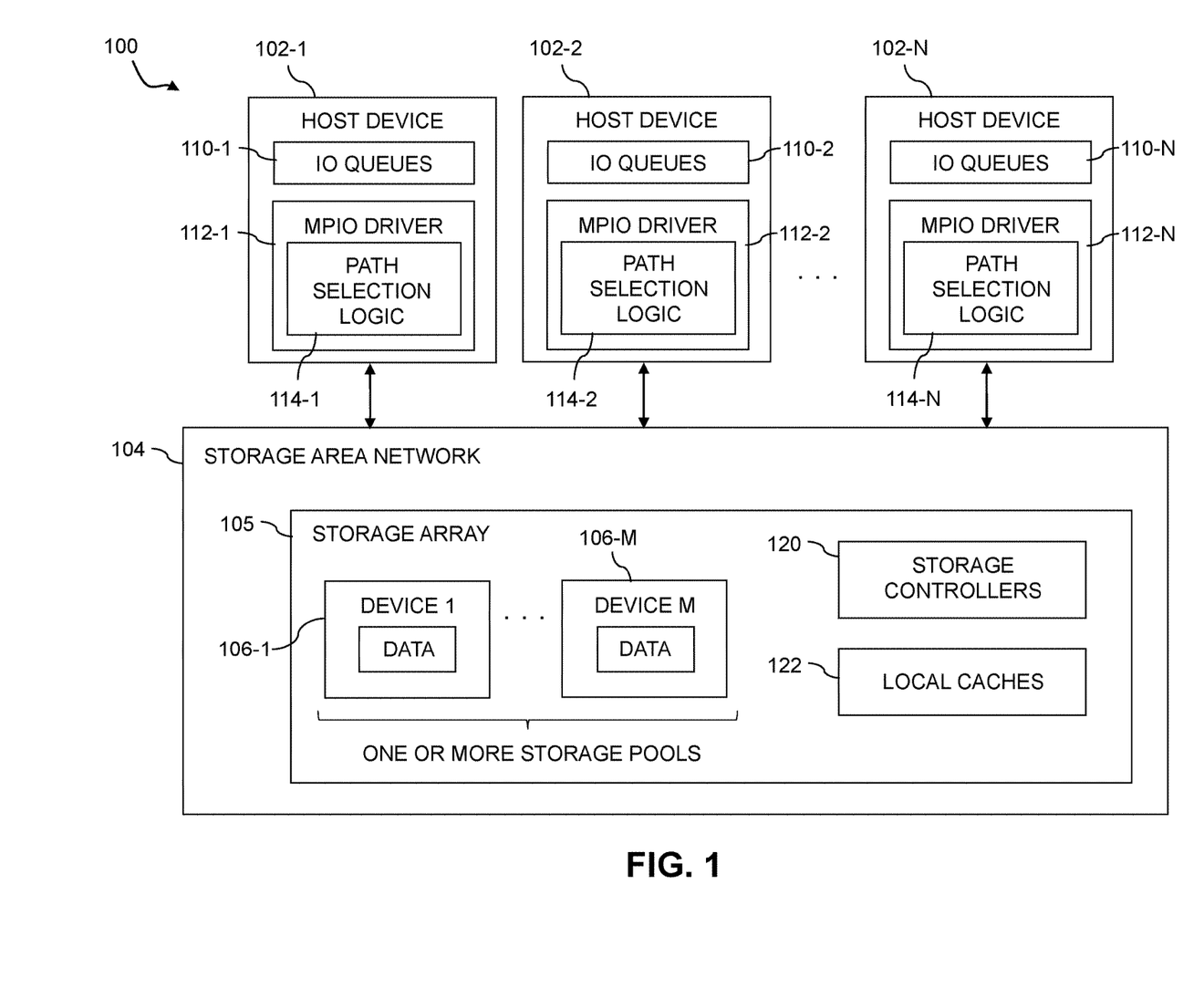
FIG. 1 is a block diagram of an information processing system configured with functionality for distribution of IO operations across storage caches utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for distribution of IO operations across local caches 122 of the storage array 105 using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for distribution of IO operations across storage caches. Other types of MPIO drivers from other driver vendors may be suitably modified to incorporate functionality for distribution of IO operations across storage caches as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine mappings of logical block addresses (LBAs) or LBA offset ranges for particular LUNs (or other logical storage volumes) to respective ones of a plurality of cache entities of the storage array 105. A cache entity may refer to a particular one of the storage controllers 120 that is associated with one of the local caches 122. Advantageously, the same LBA range is mapped to different cache entities for different ones of the LUNs. Further, adjacent LBA ranges for a particular LUN are also advantageously mapped to different cache entities. Such mappings, as will be described in further detail below, increase utilization of the cache entities of the storage array 105 (e.g., such as in sequential write load patterns).

For each of at least a subset of the IO operations, the MPIO driver 112-1 determines the particular LUN to which the IO operation is directed, also referred to as the "target LUN" of the IO operation. The MPIO driver 112-1 identifies a particular one of the cache entities, based at least in part on an LBA range of the IO operation and the determined mappings, and selects a particular one of the paths for delivery of the IO operation to the storage array 105 based at least in part on the identified cache entity. Accordingly, the storage cache distribution processing functionality of the MPIO driver 112-1 selects an appropriate path for delivery of the IO operation to the storage array 105, based at least in part on a particular cache entity identified using an LBA range of the IO operation and the determined mappings of the target LUN, and the IO operation is then delivered to the storage array 105 over the SAN 104 via the selected path.

Additional examples of distribution of IO operations across storage caches are described below in conjunction with the embodiments of FIGS. 2 and 3.

In the FIG. 1 embodiment, the storage array 105 comprises a plurality of storage controllers 120 and a plurality of local caches 122. For example, in some embodiments, each of the storage controllers 120 has a different one of the local caches 122 associated therewith, although numerous alternative arrangements are possible. The storage controllers 120 are examples of what are more generally referred to herein as "cache entities" of the storage array 105. A given "cache entity" of a storage system as the term is broadly used herein is intended to encompass a storage controller, storage processor or other system component that has a local cache or other type of cache allocated thereto or otherwise associated therewith. The caches illustratively include local caches 122, although other types of caches can be used in other embodiments. These are considered examples of "storage caches" as they are implemented in the storage array 105 or other type of storage system, rather than in host devices 102. The term "storage cache" as broadly used herein therefore refers to a cache implemented in a storage system.

Accordingly, in some embodiments, the cache entities of the storage array 105 comprise respective storage controllers 120 of the storage array 105 that have respective local caches 122 associated therewith.

The above-noted mappings of LBA or chunk ranges to respective ones of the cache entities of the storage array 105, such as respective ones of the storage controllers 120, are illustratively generated at least in part by the MPIO driver 112-1 and may be stored in one or more data structures of a kernel-space portion of an operating system of the host device 102-1. Alternatively, other components of the host device 102-1 can be involved in at least one of generation and storage of such mappings, using other types of data structures or storage arrangements.

In some embodiments, a given such mapping is generated at least in part using information obtained from the storage array 105 and characterizing the cache entities of the storage array 105, such as the storage controllers 120.

The MPIO driver 112-1 residing on the host device 102-1 is aware of the target port hierarchy for storage controllers 120 of the storage array 105, and may obtain additional data from the storage array 105 to determine information characterizing the cache entities of the storage array 105. Such additional information may include information identifying the storage controllers 120 of the storage array 105 that have respective local caches 122 associated therewith, and information about the local caches 122. The additional information may include identifying information for the storage controllers 120 that are visible to the host device 102-1, such as pseudo names or other types of cache entity identifiers or similar information. The additional information may also or alternatively comprise information about the local cache configuration of each storage entity in a storage hierarchy in the storage array 105. The additional information may further or alternatively comprise information about a chunk size for the storage array 105, such as a number of LBAs per chunk. In some embodiments, a default value for the chunk size is 4096 LBAs. It should be appreciated, however, that other default chunk size values may be utilized according to implementation choice or design limits. The additional information may further or alternatively comprise identifiers for LUNs or other logical volumes that are provisioned for use by the host device 102-1.

The above-described information may be obtained by the MPIO driver 112-1 of the host device 102-1 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, the above-described information may also or alternatively be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection, or any other communication interface that is provided or implemented by a vendor (e.g., of the host device 102-1, the MPIO driver 112-1, the storage array 105) or which is pre-configured in software of the host device 102-1 (e.g., internal or external to the MPIO driver 112-1).

As an example, a storage capacity of a LUN in number of LBAs may be obtained by the MPIO driver 112-1 by issuing a read capacity command to the storage array 105. For each LUN attached to the storage array 105, its total amount of LBAs are virtually divided into repetitive segments or chunks (e.g., chunks L1, L2, L3 . . . Ln), having the chunk size of the storage system (e.g., a default of 4096 LBAs per chunk as described above). These chunks are assigned or mapped in alpha-numeric sorted order of storage controller 120 name or identifier.

In some embodiments, the mapping of LBAs or chunks to cache entities of the storage array 105, also referred to herein as caching logic, uses the following steps:

1. The caching logic generates a permutation of an alpha-numeric sorted, or reverse sorted, string of identifiers for the storage controllers 120.

2. The caching logic assigns chunks, or sets of LBAs, for a given LUN to the local caches 122 of the storage controllers 120 based at least in part on the generated permutation string, such that adjacent chunks of the given LUN are not assigned to the same storage controller 120 and local cache 122 as much as possible. This mapping is also referred to as being horizontally different.

3. The caching logic assigns chunks for subsequent LUNs starting with different permutation strings, such that the starting chunks of adjacent LUNs are assigned to the local caches 122 of different storage controllers 120. This mapping is also referred to as being vertically different.

As an example, consider an alpha-numeric sorted order of storage controllers having associated local caches (or, more generally, storage entities of a storage system having an associated local cache) which comprises $Y(i)$, $Y(i+1)$, $Y(i+2)$ . . . $Y(i+m)$, where in the example scenario $i=1$ and $m=3$ for a total of four local caches. A storage controller sequence may comprise $A=Y1$, $B=Y2$, $C=Y3$, $D=Y4$, with each storage controller taking ownership and having its local cache mapped to one or more LBA offset ranges or chunks for each LUN.

If the mappings of the LBA offset ranges or chunks to the local caches are consistently the same (e.g., in sequence) across different LUNs, situations may occur where during a sequential write only the local cache of one or a few of the storage controllers are being used at any given time, with the remaining local caches of the other storage controllers being underutilized while they wait for the sequence to progress to the write of LBA offset ranges or chunks for which they are responsible.

The caching logic provides functionality for generating alpha-numeric sorted or reverse sorted lists of storage controllers, and for generating permutations of such a list for use in determining which storage controller will own which LBA offset ranges or chunks for particular LUNs. For example, in a storage system comprising four storage controllers, the caching logic may generate an alpha-numeric sorted string of storage controller identifiers ABCD for storage controllers with identifiers A, B, C and D. Such storage controller identifiers are an example of what is more generally referred to as cache entity identifiers. It should be noted that cache entity identifiers are not limited to being a single character, but instead may include multiple character strings.

The caching logic is further configured to generate permutations of the alpha-numeric sorted string. Continuing with the above example where the number of storage controllers, n, is 4, the caching logic may generate p permutations where the value p in some embodiments is equal to n factorial. In this example, $n!=4!=4\times3\times2\times1=24$ permutations. An example of a sorted substring of 24 permutations may comprise:

SORTED_SUB_STR={ABCD,ABDC,ACBD,ACDB, ADBC,ADCB, BACD,BADC,BCAD,BCDA,B-DAC,BDCA, CABD,CADB,CBAD,CBDA,CDAB, CDBA, DABC,DACB,DBAC,DBCA,DCAB, DCBA}

The caching logic then generates a horizontally different substring (HOR_DIFF_SUB_STR) from the sorted substring (SORTED_SUB_STR) such that adjacent chunks are assigned to the local caches of the different storage controllers for a particular LUN as much as possible (e.g., the adjacent chunks will have horizontally different assignments). The below sequence is one example of how the chunks are assigned to the horizontally different substring (HOR_DIFF_SUB_STR):

| 0 ABCD | 1 ABDC | 2 ACBD | 3 ACDB | 4 ADBC | 5 ADCB |
|---|---|---|---|---|---|
| 6 CABD | 7 CADB | 8 CBAD | 9 CBDA | 10 CDAB | 11 CDBA |
| 12 DABC | 13 DACB | 14 DBAC | 15 DBCA | 16 DCAB | 17 DCBA |
| 18 BACD | 19 BADC | 20 BCAD | 21 BCDA | 22 BDAC | 23 BDCA |

The following pseudo algorithm may be used to generate the horizontally different substring (HOR_DIFF_SUB_STR):

1. Start;
2. Repetitively traverse the sorted substring (SORTED_SUB_STR) elements until all elements are appended or inserted into the horizontally different substring (HOR_DIFF_SUB_STR) where, for each element:

2a. Append the element to the tail or end of the horizontally different substring (HOR_DIFF_SUB_STR) if the resultant string remains horizontally different;

2b. Otherwise, append the element to the head or start of the horizontally different substring (HOR_DIFF_SUB_STR) if the resultant string remains horizontally different;

2c. Otherwise, insert the element between any two elements of the horizontally different substring (HOR_DIFF_SUB_STR) if the result string remains horizontally different;

2d. Otherwise, append the element to the tail or end of the horizontally different substring (HOR_DIFF_SUB_STR);

3. End.

Since the input (e.g., the alpha-numeric sorted substring) to the above pseudo algorithm is always the same across the host devices 102, the generated horizontally different substring (HOR_DIFF_SUB_STR) would also be the same across the host devices 102. While an example algorithm is described above, it should be appreciated that other algorithms may be used in other embodiments.

The caching logic may assign the horizontally different substring (HOR_DIFF_SUB_STR) to a particular LUN, denoted as LUN2 or logical volume 2, as illustrated below:

Logical Volume 2(LUN2): ABCD|ABDC|ACB-D|ACDB|ADBC|ADCB|CABD-|CADB|CBAD|CBDA|CDAB|CDBA|DABC-|DACB|DBAC|DBCA|DCAB|DCBA|BACD|BADC|B-CAD|BCDA|BDAC|BDCA(REPEAT)

The assignment of chunks may be implemented by storing a master sequence, in a character data structure, for ease of indexing. An example master sequence is as follows:

MASTER-SEQUENCE {A,B,C,D,A,B,D,C,A,C,B,D, A,C,D,B,A,D,B,C,A,D,C,B, C,A,B,D,C,A,D,B,C, B,A,D,C,B,D,A,C,D,A,B,C,D,B,A, D,A,B,C,D,A, C,B,D,B,A,C,D,B,C,A,D,C,A,B,D,C,B,A, B,A,C, D,B,A,D,C,B,C,A,D,B,C,D,A,B,D,A,C,B,D,C,A}

Subsequent LUNs are assigned horizontally different substrings that start with different indexes of the master sequence, such that the starting chunks of the respective LUNs are assigned to the local caches of different storage controllers (e.g., they are vertically different). The vertically different substrings may be generated using an algorithm similar to that described above for generating the horizontally different substring (HOR_DIFF_SUB_STR), using the sorted substring (SORTED_SUB_STR) as input. In one example, each set of storage controllers in the vertically different substring (VER_DIFF_SUB_STR) may be assigned a number value, such as that shown below:

| 16 DCAB | 11 CDBA | 0 ABCD | 19 BADC | 8 CBAD | 23 BDCA |
|---|---|---|---|---|---|
| 12 DABC | 3 ACDB | 18 BACD | 9 CBDA | 13 DACB | 1 ABDC |
| 20 BCAD | 7 CADB | 14 DBAC | 2 ACBD | 22 BDAC | 6 CABD |
| 15 DBCA | 4 ADBC | 21 BCDA | 10 CDAB | 17 DCBA | 5 ADCB |

This may be achieved, in some embodiments, by maintaining an integer array, START_INDEX, which stores the starting index in the master sequence, for example, as follows:

START_INDEX[ ]={16,11,0,19,8,23,12,3,18,9,13,1, 20,7,14,2,22,6,15,4,21,10,17,5}

For any LUN or logical volume number X, the corresponding starting index is found from the above START_INDEX array. For example, the starting index may be determined according to X modulo P. As an example, where X=30 and p=24, 30 mod 24=6. Thus, in this example, the starting index is START_INDEX [6]=12, so a LUN or logical volume number 30 would start from permutation substring 12. The starting element, for this example, is the substring_index*n, 12*4=48 of the master sequence which results in the following horizontally different substring (HOR_DIFF_SUB_STR) for LUN or logical volume number 30:

Logical Volume 30(LUN30): DABC|DACB|D-BAC|DBCA|DCAB|DCBA|BACD|BADC|B-CAD|BCDA|BDAC|BDCA|ABCD|ABDC|ACB-D|ACDB|ADBC|ADCB|CABD|CADB|CBAD|CB-DA|CDAB|CDBA(REPEAT)

When an IO operation is received, the target logical volume and associated chunk are determined by the caching logic. For example, for an IO operation targeting LUN or logical volume number X=30, the corresponding chunk may be a chunk K=53. Given this information, the starting index and element index of the master sequence are determined based on the logical volume number X as described above. For example, X modulo P may be utilized to determine the starting index. In this scenario, 30 mod 24=6, such that the starting element index is START_INDEX[6]=12. Thus, the caching logic determines that the LUN or logical volume with number X=30 starts from permutation substring 12, and the element is determined as the substring_index*n, in this example, 12*4=48, of the master sequence (e.g., the 12th sub-string is DABC).

The element index is then derived from the master sequence. In this example, since the starting element index of the master sequence is 48 and the chunk number K is 53, the element index E is equal to the sum of the starting element index and the chunk number (e.g., 48+53=101). The sequence found in the selected horizontally different substring (HOR_DIFF_SUB_STR) is repeated. For example, there may be p*n, or 24*4=96 sequences being repeated, which results in an effective element index after counting repetition of E mod (p*n), or 101 mod 96=5. The caching logic may thus locate the particular local cache of the storage controller using the fifth element of the master sequence, which is B in this example. In other words, chunk 53 for LUN or logical volume with number X=30 is mapped to the local cache of storage controller B. Once the storage controller is identified, the cache-based load-balancing and fail-over policies may be utilized.

These and other functions related to distribution of IO operations across local caches 122 that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to determine mappings between LBAs or chunks of data of a particular LUN to cache entities of a storage system may include or be based on stored mapping information (e.g., a stored master sequence, sorted substring, horizontally different substrings, vertically different substrings, starting indexes, etc.). Such mapping information may be stored in a host device component, which may include storage in a memory or other storage devices that is internal to or external to the MPIO driver or multi-path layer.

Various conditions can lead to generation of new stored mapping information, updating of existing stored mapping information and/or deletion of existing stored mapping information in illustrative embodiments. For example, the addition of a new storage controller or new local cache can trigger the creation or update of at least a portion of the stored mapping information. Similarly, the deletion of an existing storage controller or local cache can trigger the removal or update of at least a portion of the stored mapping information.

It is to be appreciated that the term "stored mapping information" as used herein is intended to be broadly construed, as so to encompass a wide variety of different types of stored information and associated storage arrangements for relating LBA ranges or chunks of data for particular LUNs or other logical volumes to cache entities of a storage array or other storage system. References herein to determining mapping information or mappings in some embodiments includes retrieving stored mapping information. In other embodiments, however, determining mapping information or mappings may include generating the mapping information or mappings, at least a portion of which may be subsequently stored for future use.

As indicated previously, absent use of the techniques for distribution of IO operations across storage caches (or, more generally, cache entities) in a multi-path layer as disclosed herein, performance of the storage system in processing IO requests received from a host device can be adversely impacted by cache-related issues of the storage system. For example, some storage systems such as storage array 105 have write caching enabled whereby applications on host devices 102 issue IO operations to the storage array 105. These IO operations are written to local caches 122 of the storage array 105, and acknowledgements are sent back to the applications on the host devices 102 after successful write to the local caches 122. The IO operations are then de-staged from the local caches 122 to the storage devices 106 of the storage array 105 at a later time.

Some storage systems utilize cache aligned load-balancing and fail-over policies to maintain storage array and backend cache awareness. For example, write IO operations corresponding to the same LBA offset will preferentially or always be served by paths connected to the same storage controller or other storage entity that is in control of the associated local cache for that LBA offset. While cache aligned load-balancing and fail-over policies assist in reducing potential cache-misses or other related cache management overhead, in some cases ownership of the LBAs or chunks of data for the write IO operations are not intelligently distributed among the different local caches of the storage controllers or other storage entities. Since the same LBA offset ranges or chunks of data of different LUNs are not automatically distributed to the local caches associated with different storage controllers, the ability of the storage system to perform sequential write load patterns on multiple LUNs at the same time is inhibited.

As an illustration of a problematic situation of the type described above, consider a simple example of a storage array having two controllers C1 and C2 with respective local caches CA1 and CA2. The two controllers C1 and C2 have respective ports P1 and P2. Ports P1 and P2 connect the storage controllers C1 and C2, respectively, to a host device H. The storage array is assumed to be engaged in a sequential write load-pattern on multiple LUNs. For example, the storage array may be in the process of performing a host-driven migration or replication (e.g., a one-to-many replication, from one or more source LUNs to a plurality of destination LUNs). In the migration or replication, the one or more source LUNs are sequentially read and written to the destination LUNs at the same time (e.g., LBA offset by LBA offset). Since the same LBA offsets or chunks of the different source LUNs are managed by the local cache of the same storage controller, the local cache of only one storage controller is utilized at a time due to the sequential nature of the writes. This results in under-utilization of the local caches of the other storage controllers of the storage array.

Such drawbacks are advantageously overcome in illustrative embodiments herein by utilization of a multi-path layer comprising one or more of the MPIO drivers 112 to provide caching techniques and functionality for mapping the same LBA offsets or chunks of data of different LUNs to the local caches 122 of different storage controllers 120 of the storage array 105 as described above. These embodiments therefore provide a significant advance over conventional techniques that map the same LBA offsets or chunks of data from different LUNs to the local cache of the same storage controller of a storage array. For example, storage cache aware arrangements of the type disclosed herein can substantially reduce the time required for various write load patterns by increasing utilization of local caches 122 of different storage controllers 120 of the storage array 105, leading to improved overall performance. For example, when multiple LUNs are sequentially written during migrations, replications or other storage operations, increased utilization of the local caches 122 of the storage controller 120 is enabled through the use of intelligent LBA or chunk distribution across the local caches 122. Caching logic is disclosed herein which intelligently distributes the ownership of LBAs or other chunks of data (e.g., in cache aligned load-balancing and fail-over policies) in a manner that allows a multi-pathing layer provided by MPIO drivers 112, or any other layer, to automatically distribute the same LBA offset ranges or chunks of data of different LUNs to the local caches 122 associated with different storage controllers 120 or other storage entities of the storage array 105.

The above-described functions associated with distribution of IO operations across local caches 122 in the MPIO driver 112-1 are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for storage cache aware processing of IO operations.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support storage cache aware processing of IO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
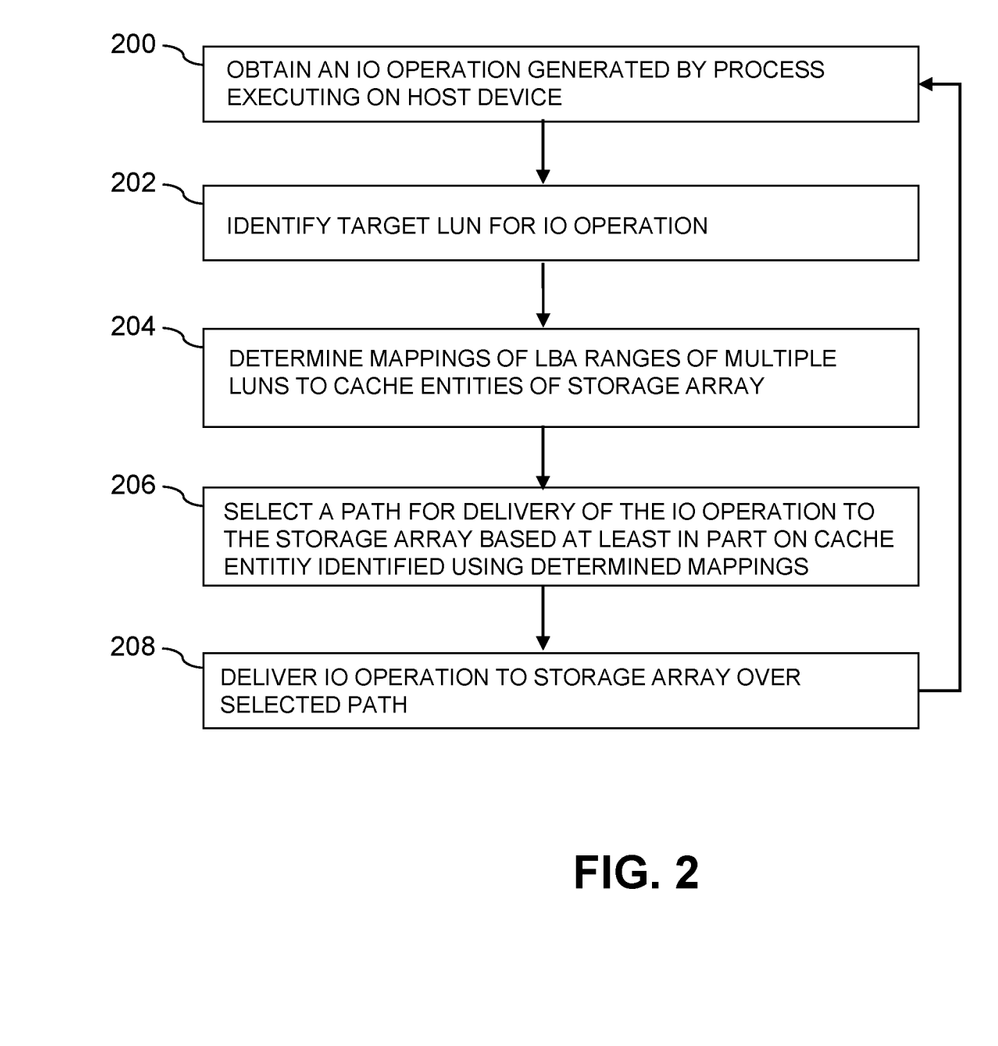
FIG. 2 is a flow diagram of a process for distribution of IO operations across storage caches utilizing a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Other arrangements of host device components and/or other system components can be configured to perform at least portions of one or more of the steps in other embodiments.

In step 200, an IO operation generated by a process executing on a host device is obtained. For example, the IO operation may be obtained by retrieving it from one of a plurality of IO queues of the host device. It is assumed that the IO operation is generated by a process of an application running on the host device, and is queued with other operations generated by other processes of that application and possibly other processes of other applications prior to delivery to a storage system having a plurality of cache entities using processing for distribution of the IO operations across the plurality of cache entities as disclosed herein.

In step 202, a particular LUN to which the IO operation is directed is identified. This LUN is referred to as the target LUN of the IO operation.

In step 204, mappings of LBA ranges of multiple LUNs, including the target LUN, to cache entities of the storage array are determined. It is assumed, in this embodiment, that the determined mappings include mappings of the same LBA ranges to different cache entities of the storage array for different ones of the multiple LUNs. It is further assumed, in this embodiment, that the determined mappings include mappings of adjacent LBA ranges for a given LUN (e.g., the target LUN) to different cache entities of the storage array. It should be noted, however, that this does not require that a particular LBA range is associated with a different cache entity for every LUN of the storage array. There may, for example, be more LUNs than there are cache entities such that a particular LBA range for at least two LUNs are associated with a same cache entity. Even in such cases, however, performance may be improved through increased utilization of cache entities as described above.

In step 206, a particular path is selected for delivery of the IO operation to the storage array, based at least in part on the particular cache entity identified from the mappings of LBA ranges determined in step 204.

In step 208, the IO operation is delivered to the storage array over the particular path selected in step 206. The FIG. 2 process then returns to step 200 as indicated in order to obtain another IO operation for further processing through steps 202 through 208 in the manner previously described.

Multiple additional instances of the FIG. 2 process may be performed in respective additional host devices that share the storage array. Other embodiments can include multiple storage arrays, with the disclosed functionality for distribution of IO operations across cache entities being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for distribution of IO operations across cache entities of the storage systems. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different cache entity distribution arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
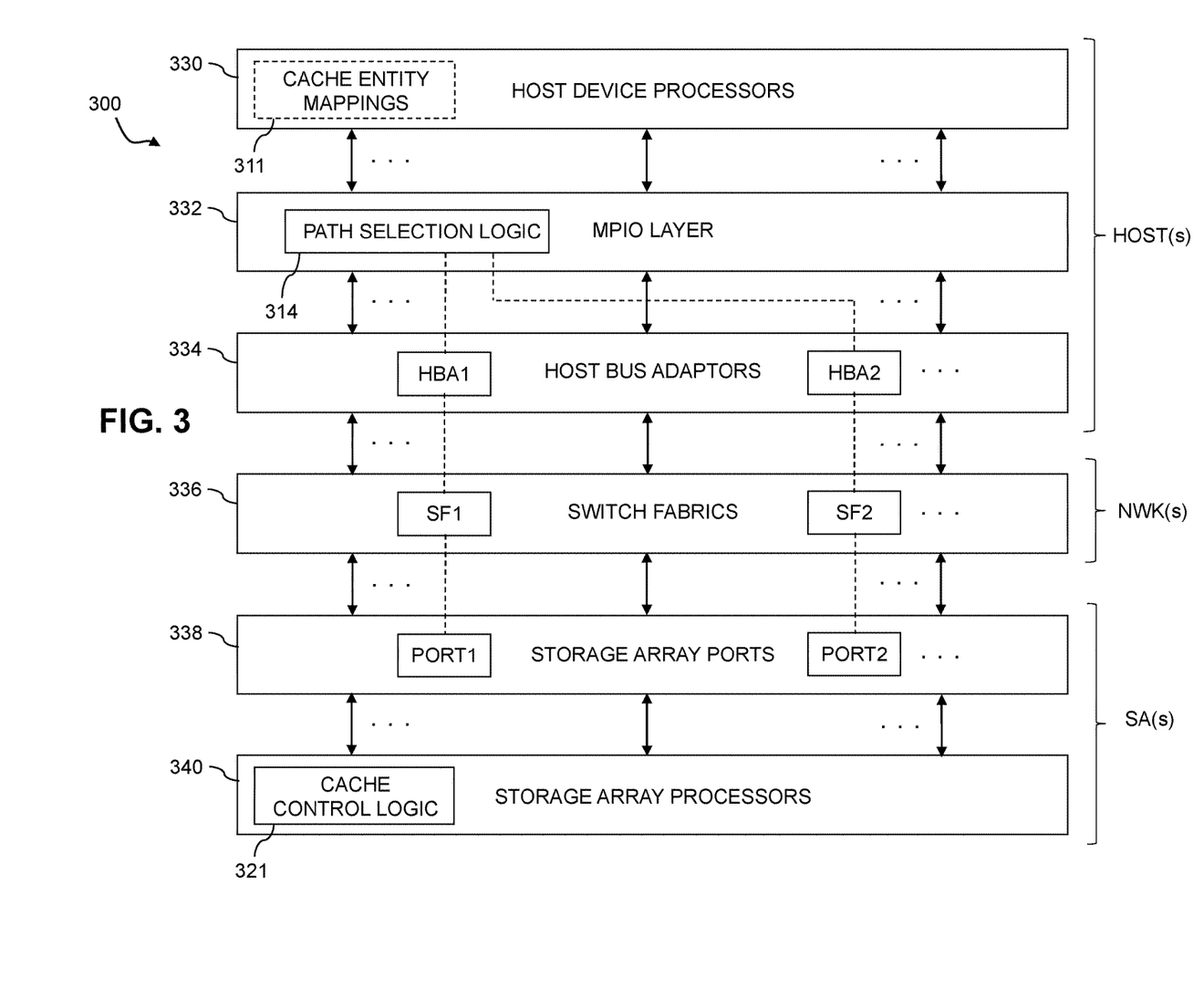
FIG. 3 is a block diagram showing multiple layers of a layered system architecture that includes a multi-path layer with functionality for distribution of IO operations across storage caches in an illustrative embodiment.

Referring now to FIG. 3, another illustrative embodiment is shown. In this embodiment, an information processing system 300 comprises one or more instances of each of cache entity mappings 311, path selection logic 314 and cache control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for distribution of IO operations across cache entities using cache entity mappings 311. The cache entity mappings 311 are illustratively shown as part of one or more host device processors of the host device processor layer 330. Again, a wide variety of other cache entity mapping storage arrangements are possible, and the cache entity mappings 311 are therefore shown in dashed outline in the figure. For example, the cache entity mappings 311 in other embodiments may be stored or generated entirely in the MPIO layer 332. It is therefore possible in some embodiments that the cache entity mappings 311 can be stored or generated utilizing a component of the MPIO layer 332, such as within a data structure of the path selection logic 314. The cache entity mappings 311 are examples of what are more generally referred to herein as mapping information used in distribution IO operations across cache entities.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for distribution of IO operations across cache entities substantially as previously described. Additional or alternative layers and path selection logic arrangements can be used in other embodiments.

The cache control logic 321 implemented in the storage array processor layer 340 controls the configuration and operation of caches associated with respective cache entities of the system 300, such as multiple local caches associated with respective ones of a plurality of storage controllers of the system 300. For example, the cache control logic 321 can include functionality for allocating available cache resources among a plurality of cache entities of a given storage array of the system 300. It is also possible in some embodiments that the cache control logic 321 can include multiple distinct cache control logic instances for multiple sets of cache entities of respective ones of a plurality of storage arrays of the system 300.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

It is assumed in this embodiment that the host devices through their respective MPIO drivers and respective instances of cache entity mappings 311 provide functionality for distribution of IO operations across cache entities, possibly with involvement of other host device components. Accordingly, the path selection logic 314 utilizes information from the cache entity mappings 311 in determining appropriate paths over which to send particular IO operations to ports of one or more storage arrays. As described elsewhere herein, such distribution across the cache entities can substantially reduce the time required for certain storage tasks such as sequential write operations and lead to significantly improved system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The particular arrangements for distribution of IO operations across cache entities described above are therefore presented by way of illustrative example only. Numerous alternative arrangements of these and other features can be used in implementing distribution of IO operations across cache entities in other illustrative embodiments.

The illustrative embodiments disclosed herein can provide a number of significant advantages relative to conventional arrangements.

As described above, conventional storage systems when processing various write load patterns (e.g., sequential write patterns) may map the same LBA offsets or chunks of different LUNs to the same cache entity (e.g., the same storage controller associated with the same local cache). Thus, only one storage controller may be utilized at a time due to the sequential natures of the writes, leading to under-utilizations of cache entities in the storage system. Illustrative embodiments provide techniques for mapping the same LBA offsets or chunks of different LUNs to different cache entities, such that utilization of the cache entities is improved during such write load patterns. Such mapping techniques may also map adjacent LBA offsets or chunks of a particular LUN to different cache entities providing additional improvement in utilization of the cache entities.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated arrangements for distribution of IO operations across cache entities of storage systems can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising a multi-path input-output driver configured to control delivery of input-output operations to the storage system over selected ones of a plurality of paths through the network;
wherein the multi-path input-output driver is further configured:
to determine mappings between ranges of logical block addresses of two or more logical storage volumes and respective ones of a plurality of cache entities of the storage system, wherein the plurality of cache entities comprise respective components of the storage system that have respective local caches associated therewith, and wherein determining the mappings between the ranges of logical block addresses of the two or more logical storage volumes and respective ones of the plurality of cache entities of the storage system comprises determining a sequence of identifiers of the plurality of cache entities and assigning ranges of logical block addresses of the two or more storage volumes to respective ones of the plurality of cache entities based at least in part on the sequence of identifiers;
to select, for a first input-output operation comprising a first set of logical block addresses of a first one of the two or more logical storage volumes, a first one of the plurality of paths associated with a first one of the plurality of cache entities of the storage system based at least in part on a first starting index in the sequence of identifiers associated with the first logical storage volume and a first element index in the sequence of identifiers associated with the first set of logical block addresses of the first logical storage volume; and
to select, for a second input-output operation comprising a second set of logical block addresses of a second one of the two or more logical storage volumes, a second one of the plurality of paths associated with a second one of the plurality of cache entities of the storage system based at least in part on a second starting index in the sequence of identifiers associated with the second logical storage volume and a second element index in the sequence of identifiers associated with the second set of logical block addresses of the second logical storage volume, the second starting index being different than the first starting index and the second element index being different than the first element index.

2. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

3. The apparatus of claim 1 wherein the plurality of cache entities of the storage system comprise respective storage controllers of the storage system with each such storage controller having a different local cache associated therewith.

4. The apparatus of claim 1 wherein the multi-path input-output driver is further configured to select, for a third input-output operation comprising a second third set of logical block addresses of the first logical storage volume, an additional one of the plurality of paths associated with an additional one of the plurality of cache entities different than the first cache entity of the storage system.

5. The apparatus of claim 4 wherein the additional cache entity comprises the second cache entity.

6. The apparatus of claim 4 wherein the second third set of logical block addresses of the first logical storage volume comprises a second set of logical block address offsets adjacent to a first set of logical block address offsets of the first set of logical block addresses of the first logical storage volume.

7. The apparatus of claim 1 wherein determining the mappings between the ranges of logical block addresses of the two or more logical storage volumes and respective ones of the plurality of cache entities of the storage system comprises determining, from the sequence of identifiers of the plurality of cache entities, starting indexes for each of the two or more logical storage volumes.

8. The apparatus of claim 7 wherein determining the mappings between the ranges of logical block addresses of the two or more logical storage volumes and respective ones of the plurality of cache entities of the storage system comprises determining, from the sequence of identifiers of the plurality of cache entities, element indexes for different logical block address offsets for a given one of the two or more logical storage volumes based at least in part on a given one of the starting indexes for the given logical storage volume.

9. The apparatus of claim 1 wherein determining the sequence of identifiers of the plurality of cache entities comprises:
   generating an alpha-numeric sorted string of the identifiers of the plurality of cache entities;
   determining a plurality of permutations of the alpha-numeric sorted string of the identifiers of the plurality of cache entities;
   generating a sorted substring of the plurality of permutations of the alpha-numeric sorted string of the identifiers of the plurality of cache entities; and
   generating a horizontally different substring from the sorted substring, the horizontally different substring comprising an ordering of the plurality of permutations of the alpha-numeric sorted strings of the identifiers of the plurality of cache entities that avoids consecutive entries having the same cache entity identifier.

10. The apparatus of claim 1 wherein selecting the first path comprises:
    identifying a given volume number of the first logical storage volume and a given logical block address offset number of the first set of logical block addresses of the first logical storage volume;
    determining the first starting index in the sequence of identifiers of the plurality of cache entities for the first logical storage volume based at least in part on the given volume number of the first logical storage volume; and
    determining the first element index in the sequence of identifiers of the plurality of cache entities for the first set of logical block addresses of the first logical storage volume based at least in part on the first starting index and the given logical block address offset number, wherein the first cache entity is associated with an identifier of the first element index.

11. The apparatus of claim 10 wherein determining the first starting index in the sequence of identifiers of the plurality of cache entities for the first logical storage volume comprises calculating X modulo (p*n), where X denotes the given volume number of the first logical storage volume, p denotes a total number of the plurality of permutations, and n denotes a total number of the plurality of cache entities.

12. The apparatus of claim 10 wherein determining the first element index in the sequence of identifiers of the plurality of cache entities for the first logical storage volume comprises calculating E modulo (p*n), where E denotes a sum of the given volume number of the first logical storage volume and the given logical block address offset number of the first set of logical block addresses, p denotes a total number of the plurality of permutations, and n denotes a total number of the plurality of cache entities.

13. A method comprising:
    executing in a host device one or more processes that generate input-output operations for delivery over a network to a storage system comprising a plurality of storage devices;
    implementing a multi-path input-output driver in the host device, the multi-path input-output driver controlling delivery of the input-output operations from the host device to the storage system over selected ones of a plurality of paths through the network; and
    configuring the multi-path input-output driver to perform steps of:
        determining mappings between ranges of logical block addresses of two or more logical storage volumes and respective ones of a plurality of cache entities of the storage system, wherein the plurality of cache entities comprise respective components of the storage system that have respective local caches associated therewith, and wherein determining the mappings between the ranges of logical block addresses of the two or more logical storage volumes and respective ones of the plurality of cache entities of the storage system comprises determining a sequence of identifiers of the plurality of cache entities and assigning ranges of logical block addresses of the two or more storage volumes to respective ones of the plurality of cache entities based at least in part on the sequence of identifiers;
        selecting, for a first input-output operation comprising a first set of logical block addresses of a first one of the two or more logical storage volumes, a first one of the plurality of paths associated with a first one of the plurality of cache entities of the storage system based at least in part on a first starting index in the sequence of identifiers associated with the first logical storage volume and a first element index in the sequence of identifiers associated with the first set of logical block addresses of the first logical storage volume; and
        selecting, for a second input-output operation comprising a second set of logical block addresses of a second one of the two or more logical storage volumes, a second one of the plurality of paths associated with a second one of the plurality of cache entities of the storage system based at least in part on a second starting index in the sequence of identifiers associated with the second logical storage volume and a second element index in the sequence of identifiers associated with the second set of logical block addresses of the second logical storage volume, the second starting index being different than the first starting index and the second element index being different than the first element index.

14. The method of claim 13 further comprising configuring the multi-path input-output driver to perform the step of selecting, for a third input-output operation comprising a third set of logical block addresses of the first logical storage volume, an additional one of the plurality of paths associated with an additional one of the plurality of cache entities different than the first cache entity of the storage system.

15. The method of claim 13 wherein determining the mappings between the ranges of logical block addresses of the two or more logical storage volumes and respective ones of the plurality of cache entities of the storage system comprises:
determining, from the sequence of identifiers of the plurality of cache entities, starting indexes for each of the two or more logical storage volumes.

16. A computer program product comprising a non-transitory processor-readable storage medium having stored therein program code of one or more software programs, wherein the program code, when executed by a host device configured to communicate over a network with a storage system comprising a plurality of storage devices, causes the host device:
to execute one or more processes that generate input-output operations for delivery over the network to the storage system;
to implement a multi-path input-output driver in the host device, the multi-path input-output driver controlling delivery of the input-output operations from the host device to the storage system over selected ones of a plurality of paths through the network; and
to configure the multi-path input-output driver to perform steps of:
determining mappings between ranges of logical block addresses of two or more logical storage volumes and respective ones of a plurality of cache entities of the storage system, wherein the plurality of cache entities comprise respective components of the storage system that have respective local caches associated therewith, and wherein determining the mappings between the ranges of logical block addresses of the two or more logical storage volumes and respective ones of the plurality of cache entities of the storage system comprises determining a sequence of identifiers of the plurality of cache entities and assigning ranges of logical block addresses of the two or more storage volumes to respective ones of the plurality of cache entities based at least in part on the sequence of identifiers;
selecting, for a first input-output operation comprising a first set of logical block addresses of a first one of the two or more logical storage volumes, a first one of the plurality of paths associated with a first one of the plurality of cache entities of the storage system based at least in part on a first starting index in the sequence of identifiers associated with the first logical storage volume and a first element index in the sequence of identifiers associated with the first set of logical block addresses of the first logical storage volume; and
selecting, for a second input-output operation comprising a second set of logical block addresses of a second one of the two or more logical storage volumes, a second one of the plurality of paths associated with a second one of the plurality of cache entities of the storage system based at least in part on a second starting index in the sequence of identifiers associated with the second logical storage volume and a second element index in the sequence of identifiers associated with the second set of logical block addresses of the second logical storage volume, the second starting index being different than the first starting index and the second element index being different than the first element index.

17. The computer program product of claim 16 wherein the program code when executed further configures the multi-path input-output driver to perform the step of selecting, for a third input-output operation comprising a second third set of logical block addresses of the first logical storage volume, an additional one of the plurality of paths associated with an additional one of the plurality of cache entities different than the first cache entity of the storage system.

18. The computer program product of claim 16 wherein determining the mappings between the ranges of logical block addresses of the two or more logical storage volumes and respective ones of the plurality of cache entities of the storage system comprises:
determining, from the sequence of identifiers of the plurality of cache entities, starting indexes for each of the two or more logical storage volumes.

19. The computer program product of claim 18 wherein determining the mappings between the ranges of logical block addresses of the two or more logical storage volumes and respective ones of the plurality of cache entities of the storage system comprises determining, from the sequence of identifiers of the plurality of cache entities, element indexes for different logical block address offsets for a given one of the two or more logical storage volumes based at least in part on the starting index for the given logical storage volume.

20. The computer program product of claim 16 wherein selecting the first path comprises:
identifying a given volume number of the first logical storage volume and a given logical block address offset number of the first set of logical block addresses of the first logical storage volume;
determining the first starting index in the sequence of identifiers of the plurality of cache entities for the first logical storage volume based at least in part on the given volume number of the first logical storage volume; and
determining the first element index in the sequence of identifiers of the plurality of cache entities for the first set of logical block addresses of the first logical storage volume based at least in part on the first starting index and the given logical block address offset number, wherein the first cache entity is associated with an identifier of the first element index.

* * * * *